J. & W. L. HEBERLING.
Root Cutter.
No. 76,912.
Patented April 21, 1868.
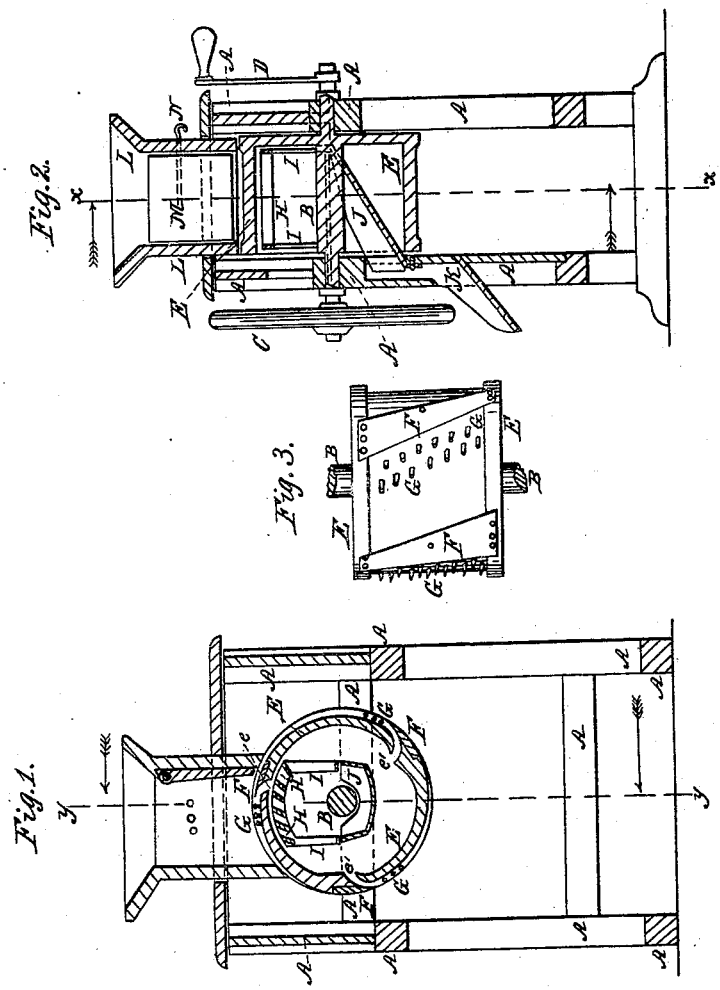
Witnesses:
Inventors:

United States Patent Office.

JOHN HEBERLING AND WILLIAM L. HEBERLING, OF MOUNT PLEASANT, OHIO.

Letters Patent No. 76,912, dated April 21, 1868.

IMPROVEMENT IN ROOT-CUTTERS.

*The Schedule referred to in these Letters Patent and making part of the same.*

TO ALL WHOM IT MAY CONCERN:

Be it known that we, JOHN HEBERLING and WILLIAM L. HEBERLING, of Mount Pleasant, in the county of Jefferson, and State of Ohio, have invented a new and improved Root-Cutter; and we do hereby declare that the following is a full, clear, and exact description thereof, which will enable others skilled in the art to make and use the same, reference being had to the accompanying drawings, forming part of this specification, in which—

Figure 1 is a vertical cross-section of our improved machine, taken through the line $x$ $x$, fig. 2.

Figure 2 is a vertical longitudinal section of the same, taken through the line $y$ $y$, fig. 1.

Figure 3 is a detail top view of the knife-cylinder.

Similar letters of reference indicate corresponding parts.

Our invention has for its object to furnish an improved machine for cutting roots for cattle and sheep, which shall be simple and durable in construction, not liable to get out of order, which will cut the pieces of uniform size, may be adjusted to cut the pieces large or small, and will feed itself equally as well under a rapid as under a slow motion; and it consists in the construction, combination, and arrangement of the various parts of the machine as hereinafter more fully described.

A is the frame of the machine, the upper part of which is encased, as shown in figs. 1 and 2.

B is a shaft, revolving in bearings in the frame A of the machine, and having a balance-wheel, C, attached to one end, and to the other end of which the crank, D, or other motive-power is attached.

E is a hollow cylinder, open at one end, and rigidly attached at the other end to the shaft B, so as to be carried with said shaft in its revolution.

The drum or shell of the cylinder E is formed with three inclined slots, $e'$, extending from end to end, said slots also inclining or curving towards the centre of the cylinder as they pass through the case or drum.

F are knives, which are securely attached to the face of the cylinder, so that their forward parts or edges may project over the curved or inclined slots $e'$, as shown in fig. 1, the inclination of the knives F, and of the spaces between them, having a tendency to draw or feed the roots towards the said knives while the machine is being operated, so that it will feed itself equally well whether revolved slow or fast.

The knives F project in such a way as to cut strips or slices from the roots about half an inch thick, more or less, as may be desired.

To the convex surface of the cylinder E are attached two rows of knives, G, in such a way as to make cuts in the roots about half an inch apart, and of a depth equal to the thickness of the slice cut by the knives F, so that the cut-away parts of the roots may pass through the inclined or curved slots $e'$, in the form of strips about half an inch in breadth and thickness.

The knives G project upwards, and at the same time should incline forward or from the knives F, so that their tendency may be to draw the roots down close to the surface of the cylinder E in proper position to be operated upon by the knives F.

H is a series of inclined knives, attached to or formed upon a frame, I, which is supported in position by being attached at the open end of the cylinder E to the cross-bar of the frame A, as shown in dotted lines in fig. 2.

The frame I and knives H are so arranged that, as the strips pass from the knives G and F through the inclined or curved slots $e'$, they may be met by the knives H, and cut into pieces of uniform size, said pieces being about half an inch square, and about one and a quarter inch long.

The knives G, F, and H may be adjusted to cut larger or smaller pieces, as may be desired.

The cut pieces fall from the knives H into the spout J, the outer end of which is attached to the frame of the machine, or to some other suitable support at the open end of the cylinder E.

The inner or upper end of the spout, if desired or thought necessary, may be suspended from the inner end of the frame I.

From the spout J the pieces pass out of the machine through the discharging-spout, K.

L is the hopper, against the forward side of which the roots are pressed while being operated upon by the knives G and F.

M is a loose board, pivoted at its upper end to the sides of the hopper L, and the lower end of which may be adjusted more or less forward, according as it is desired to feed roots to the cylinder more or less forward.

The board or adjustable side M is supported in the desired position by a pin, N, passing in through the side of the hopper L, and against the forward or inner part of which the side-board rests.

We claim as new, and desire to secure by Letters Patent—

1. The knives H, or their equivalent, substantially as described and for the purpose set forth.

2. The oblique curved slots $e'$, having an offset directly beneath the forward part of the knives F, to prevent clogging, the concave and convex sides of which curves bend or turn towards the stationary cutting-knives used in connection therewith, as seen at $e'$, fig. 1, all strips or slices that pass through.

3. The projecting cutters G, or their equivalent, for the purpose specified.

4. The combination of the projecting cutters G, knife F, curved slots $e'$, and knives H, as shown, and for the purpose specified.

5. Such a regular inclination of the surface of the knives and the periphery of the cylinder, from the edge of each knife to the one next in its rear, as to bring the said surface within the edge of it a sufficient distance to constitute the throat.

6. The hollow metallic cylinder E, having rimmed ends, one of which is open, inclined periphery, oblique curved slots $e'$, substantially as shown and described.

JOHN HEBERLING,
WILLIAM L. HEBERLING.

Witnesses:
 J. J. GILL,
 L. L. SMITH.